(12) United States Patent
Shimizu

(10) Patent No.: US 6,180,079 B1
(45) Date of Patent: *Jan. 30, 2001

(54) WET OXIDIZING PROCESS

(75) Inventor: Isoo Shimizu, Yokohama (JP)

(73) Assignee: Nippon Petrochemicals Company, Limited, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/789,387

(22) Filed: Jan. 28, 1997

(30) Foreign Application Priority Data

Jan. 31, 1996 (JP) .................................................. 8-038862

(51) Int. Cl.⁷ .............................. C01B 17/02; C02F 1/78
(52) U.S. Cl. ................................... 423/567.1; 423/576.2; 423/DIG. 11; 210/761; 210/928
(58) Field of Search .................. 423/DIG. 11, 516.2, 423/567.1; 210/761, 762, 928

(56) References Cited

U.S. PATENT DOCUMENTS

| | | | |
|---|---|---|---|
| 2,261,921 | 11/1941 | Pittman et al. | 210/2 |
| 3,186,942 | 6/1965 | Benger et al. | 210/63 |
| 3,761,409 | 9/1973 | McCoy et al. | 210/63 |
| 4,070,281 | 1/1978 | Tagashira et al. | 210/26 |
| 4,094,780 * | 6/1978 | Iwai et al. | 210/63 |
| 4,155,848 | 5/1979 | Sato et al. | 210/60 |
| 4,203,156 | 5/1980 | Ishikawa . | |
| 4,266,942 | 5/1981 | Vandenbossche et al. . | |
| 4,302,299 | 11/1981 | Ishikawa . | |
| 4,350,599 | 9/1982 | Chowdhury | 210/761 |
| 4,399,111 | 8/1998 | Baur et al. | 423/226 |
| 4,756,837 | 7/1988 | Nadezhdin | 210/761 |
| 4,767,543 | 8/1988 | Chornet et al. | 210/759 |
| 4,795,568 | 1/1989 | Chen | 210/761 |
| 5,082,571 | 1/1992 | Beula et al. | 210/739 |
| 5,230,810 | 7/1993 | Clark et al. . | |
| 5,298,174 | 3/1994 | Momont et al. . | |
| 5,389,264 | 2/1995 | Lehmann et al. | 210/26 |
| 5,460,732 * | 10/1995 | Monont et al. | 210/761 |
| 5,777,191 | 7/1998 | Shimizu et al. . | |

FOREIGN PATENT DOCUMENTS

| | | |
|---|---|---|
| 0 014 374 A1 | 8/1980 | (EP) . |
| 0 513 454 A1 | 11/1992 | (EP) . |
| 0 534 650 A1 | 3/1993 | (EP) . |
| 2413659 | 7/1979 | (FR) . |
| 2 043 045 | 10/1980 | (GB) . |
| 47-44956 | 11/1972 | (JP) . |
| 49-54269 | 5/1974 | (JP) . |
| 49-33845 | 9/1974 | (JP) . |
| 51-79961 | 7/1976 | (JP) . |
| 52-150778 | 12/1977 | (JP) . |
| 53-19480 | 6/1978 | (JP) . |
| 54-108462 | 8/1979 | (JP) . |
| 55-41158 | 10/1980 | (JP) . |
| 4-338285 | 11/1992 | (JP) . |
| 6-277682 | 10/1994 | (JP) . |
| 7-979 | 1/1995 | (JP) . |

OTHER PUBLICATIONS

McCoy., J. W., "Chemical Analysis of Industrial Water", Chemical Publishing Co., New York, 1969, pp. 125–153.
"Manual on Disposal of Refinery Wastes, Volume on Liquid Wastes," Chapter 11—Oxidation; American Petroleum Institute, 1969, pp. 11–3 through 11–9.

* cited by examiner

*Primary Examiner*—Gary P. Straub
(74) *Attorney, Agent, or Firm*—Hollander Law Firm, P.L.C.

(57) ABSTRACT

In wet oxidizing process of an aqueous alkali waste which contains absorbed hydrogen sulfide and carbon dioxide, a convenient method for improving the safety in oxidizing operation and the efficiency in oxidation reaction. The process is characterized in that an equivalent weight number A of a strong acid consumed until the pH reaches about 9 and an equivalent weight number B of the strong acid consumed until the pH reaches about 4 in neutralization titration of the aqueous alkali waste, satisfy the relationship which is represented by the following equation [I]:

$$2A-B>0 \qquad [I]$$

15 Claims, No Drawings

WET OXIDIZING PROCESS

BACKGROUND OF THE INVENTION

(1) Field of the Invention

The present invention relates to a wet oxidizing process for a waste liquid, the so-called waste soda. When light hydrocarbons containing sulfur components such as naphtha, butane and ethane are thermally cracked, sulfur compounds are contained in the obtained hydrocarbon fluid of ethylene and propylene. The sulfur content of this hydrocarbon fluid is removed by absorption using an aqueous alkali and the aqueous alkali after the absorption is discharged as the waste soda.

(2) Description of Prior Art

When hydrocarbons containing sulfur components are processed by thermal cracking, catalytic cracking or catalytic reforming, the sulfur components are mainly converted into hydrogen sulfide. Because the hydrogen sulfide has undesirable actions such as catalyst poison in the subsequent purifying step of the cracked products, it is required to remove such hydrogen sulfide.

As an industrial removing method, a method for absorbing and removing by bringing the hydrogen sulfide into contact with an aqueous alkali has been commonly employed. The aqueous alkali waste which is discharged from the washing operation by the use of an aqueous alkali is usually called as "waste soda", which has strong offensive smell due to the absorbed hydrogen sulfide and which exhibits also a high value of chemical oxygen demand (COD). That is, the simple absorption of the sulfur components with an aqueous alkali still involves such a problem that when the absorption liquid is acidified due to some change in environmental conditions, the hydrogen sulfide is released from the absorbed liquid. In view of the antipollution, it is necessary to take effective measures for the removal of bad smell and decreasing of COD value.

Among the methods or processes which have been proposed heretofore as the operations for excluding noxious effects of the above described aqueous alkali waste, a process for oxidizing hydrogen sulfide by bringing the same into contact with molecular oxygen under the condition in which water can exist in liquid phase, i.e., a wet oxidizing process is considered as a desirable process in industrial point of view. This process is the one for oxidizing the sulfur atom of hydrogen sulfide to its higher oxidized state, so that even when the absorption liquid is acidified, hydrogen sulfide is not liberated.

However, when the sulfur atom reaches a higher oxidized state, there is a possibility at the same time that the pH of waste liquid after the oxidation is lowered, and it results in the apprehension for the corrosion of oxidation reactor in such a low pH.

As the countermeasures against the above described corrosion, a variety of methods or processes have been proposed. For instance, it is proposed in Japanese Patent Laid-Open Publication No. 4-338285 that various materials contained in a waste soda liquid are analyzed to determine the amount of alkali required for neutralizing the sulfur produced by oxidation on the basis of primary and secondary dissociation constants of hydrogen sulfide and carbonic acid by means of calculation, and the amount of alkali additionally required for the neutralization is added to the solution to be treated.

More specifically, in the above method as disclosed in the Laid-Open patent gazette, the total alkalinity, total sulfides, mercaptans, COD, thiosulfates, total carbonates, and pH have previously been measured by means of analysis of waste soda, the amount of total sulfides is separated into the amount of sulfides and that of hydrosulfides, while the amount of total carbonates are separated into the amount of carbonates and that of bicarbonates by calculation on the basis of the primary and the secondary dissociation constants of hydrogen sulfide and carbonic acid obtained from a literature, and the amount of existing caustic soda is calculated from the pH value to estimate the quantity of alkali consumed in the process of the wet oxidizing reaction, whereby an alkali in the amount to be additionally consumed in the reaction is added to the aqueous alkali waste. This method is the one for calculating the amount of hydrosulfide as the source for generating acids in the process of wet oxidation, thereby determining the minimum amount of alkali required for avoiding the change waste liquid into acidic with the generated acids.

However, because the method adopts a calculating method in which dissociation constants of hydrogen sulfide and carbonic acid are used as the basis of determination of alkalinity and quantitative determination of hydrogen sulfide, the reliability in confirming the safety level depends upon the precision of these dissociation constants. It is generally well known that several different numerical values have been reported for the dissociation constants of a variety of materials. In this respect, because the estimation on the safety in operations depends upon the dissociation constants adopted, the uncertainty cannot be avoided. Furthermore, since these dissociation constants are functions of temperature and pressure, the level of certainty is lowered unless these points are also taken into consideration.

The technique described in Japanese Patent Laid-Open Publication No. 7-979 is also the one wherein wet oxidation is conducted by adopting a calculating method using also dissociation constants of hydrogen sulfide and carbonic acid as in the above described method, and this method involves the similar problems as those of the former method.

Moreover, in a treating process of waste soda by means of wet oxidation, it is also important to increase an efficiency for lowering COD in addition to the importance in the above-mentioned estimation of the prevention of corrosion due to the elevation of acidity in the fluid to be processed.

That is, the sulfur content absorbed in the aqueous alkali exists in an equilibrium condition as sodium sulfa and sodium hydrosulfide in the waste soda employed in the present invention. When both of the sulfate and the hydrosulfide are subjected to wet oxidization without the presence of any catalyst, the reactions of two stages proceed through sodium thiosulfate, respectively, as described hereunder:

(1) Oxidation of sodium sulfide

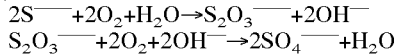

$2S^{=} + 2O_2 + H_2O \rightarrow S_2O_3^{=} + 2OH^{-}$ $S_2O_3^{=} + 2O_2 + 2OH^{-} \rightarrow 2SO_4^{=} + H_2O$ (2) Oxidation of sodium hydrosulfide

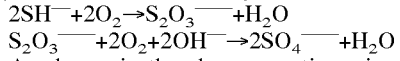

$2SH^{-} + 2O_2 \rightarrow S_2O_3^{=} + H_2O$ $S_2O_3^{=} + 2O_2 + 2OH^{-} \rightarrow 2SO_4^{=} + H_2O$ As shown in the above equations, in order to proceed rapidly the oxidation of sodium thiosulfate being in the intermediate step of the oxidation reaction, it is necessary that the $OH^{-}$ ions exist in the reaction system.

Concerning the type of reaction in the industrial working, it is apparent that a continuous operation is more preferable than a batch operation, and in the case where the continuous operation is adopted, it is required particularly to proceed the reaction within a limited period of time, so that the higher rate of reaction is advantageous. Accordingly, it is important to check up whether the composition of the waste soda is in a suitable condition for the rapid reaction or not.

OBJECT AND SUMMARY OF THE INVENTION

It is, therefore, the object of the present invention to provide a convenient process for ensuring safety in the oxidation operation and efficient proceeding of the oxidation reaction in wet oxidation of an aqueous alkali waste which has absorbed hydrogen sulfide and carbon dioxide as the main acidic materials.

More specifically, the first aspect of the present invention resides in a wet oxidizing process for oxidizing an aqueous alkali waste by using molecular oxygen. The aqueous alkali waste is produced by bringing an aqueous alkali in contact with a hydrocarbon fluid containing hydrogen sulfide and carbon dioxide as the main acidic components to absorb the acidic components. The method of the invention is characterized in that an equivalent weight number (A) of a strong acid which is consumed until the pH reaches about 9 and an equivalent weight number (B) of the strong acid consumed until the pH reaches about 4 as a result of neutralization titration of the aqueous alkali waste satisfies the relationship represented by the following equation [I].

$$2A-B>0 \quad [I]$$

The second aspect of the present invention resides in a wet oxidizing process as described in the aforesaid first aspect of the invention which is characterized in that said aqueous alkali is an aqueous caustic soda.

The third aspect of the present invention resides in a wet oxidizing process as described in the aforesaid first aspect of the invention which is characterized in that the wet oxidation is conducted by using a continuous flow type apparatus.

The present invention will be further described hereinafter.

The "hydrocarbon fluid containing hydrogen sulfide and carbon dioxide as main components" means a fluid of hydrocarbon in a liquid phase, gaseous phase or a mixture of them. An example of the hydrocarbon fluid is exemplified by the gas containing a noncondensing olefin such as ethylene which is obtained in the production of olefins such as ethylene and propylene through the thermal cracking or catalytic cracking of a light hydrocarbon containing sulfur contents such as naphtha, butane and ethane. The above described light hydrocarbon contains sulfur and oxygen, so that when these elements are thermally cracked, hydrogen sulfide and carbon dioxide are produced, and these gases are contained in the noncondensing olefin gas such as ethylene. In general, hydrogen gas, acetylene and the like are also contained in the above described gas, however, hydrogen sulfide and carbon dioxide are the main components as acidic materials.

Furthermore, the reformed gasoline obtained in the reforming process to increase the yield of aromatic hydrocarbons such as benzene, toluene and xylene or to raise the octane number or the aromatic hydrocarbon fractions such as $C_6$ to $C_{10}$ fractions contain also sulfur, oxygen and the like. These elements are converted into hydrogen sulfide and carbon dioxide in the reforming operation, so that they are contained in the hydrocarbon fractions. Still further, for instance, the aromatic hydrocarbon fractions obtained from the isomerization process of $C_8$ hydrocarbon contains also hydrogen sulfide and carbon dioxide mainly as the acidic substances like the above described cases. These aromatic hydrocarbon fractions are also included in the hydrocarbon fluids referred to in the present invention.

Among the variety of these hydrocarbon fluids, a preferred gas is the one containing noncondensing olefins such as ethylene which is produced in thermal or catalytic cracking of light hydrocarbons containing sulfur contents such as the above described naphtha, butane, and ethane for the production of olefins such as ethylene, and propylene. Major acidic substances contained in the above described hydrocarbon fluids are hydrogen sulfide and carbon dioxide, while the contents of acidic materials of mercaptan and carboxylic acids are small.

A selective hydrogenating process is applied to an olefin gas such as ethylene in the purification step in order to remove highly unsaturated hydrocarbons such as acetylene. In such a case, there is a possibility that the hydrogen sulfide existing in the olefin gas acts as a catalyst poison for the dehydrogenating catalyst. In order to remove the hydrogen sulfide as the catalyst poison, the olefin gas is washed with an aqueous alkali in a scrubber so as to absorb the hydrogen sulfide into the aqueous alkali. In this step, the acidic substance such as carbon dioxide in the olefin gas is also absorbed simultaneously into the aqueous alkali.

Generally, as a washing liquid for the scrubber, alkalis such as caustic soda, caustic potash and ammonia are employed. The aqueous solution of strong base such as caustic soda is preferably employed. Furthermore, in order to prevent the washing liquid from the change into an acidic state in which hydrogen sulfide is liberated in the scrubber, the alkalinity in the washing liquid is usually made excessive in comparison with the amount of acidic substances in the hydrocarbon fluid.

The wet oxidation of the present invention will be described hereunder by way of an example of an aqueous alkali waste obtained by washing with an aqueous caustic soda in a scrubber.

As described above, the sulfur content exists as sodium sulfide and sodium hydrosulfide in equilibrium state in the aqueous alkali waste which has absorbed hydrogen sulfide and carbon dioxide in the scrubber. In general, sodium thiosulfate is not substantially detected. On the other hand, the carbon dioxide absorbed as an acidic substance exists substantially in the form of sodium carbonate, but it does not exist in the form of sodium bicarbonate.

Because the aqueous alkali waste from the scrubber sometimes contains a small amount of oily hydrocarbons, a pretreatment such as extraction separation is usually done before feeding it to the wet oxidizing process. Accordingly, the oily hydrocarbons are generally removed to the degree in which the wet oxidation is not substantially influenced. In the wet oxidizing process of the present invention, such an aqueous alkali waste as above is used for the wet oxidation.

In the present invention, neutralization titration is previously done with respect to the aqueous alkali waste to be fed to the wet oxidizing process by using an aqueous solution of strong acid as a neutralizing reagent in accordance with a conventional procedure.

In the above neutralization titration, the equivalent weight number (A) of strong acid consumed until the pH value of the waste liquid reaches about 9 and another equivalent weight number (B) of strong acid consumed until the pH value reaches about 4 are determined. In this case, either the equivalent weight numbers (A) and (B) are determined with respect to the same waste liquid by means of successive titration operations, or different parts of the waste liquid may be titrated to determine separately the equivalent weight numbers (A) and (B). When the titration is done separately, the equivalent weight numbers are determined by converting the volumes of samples into the same value.

In the present invention, the components which are contained in waste soda and determined by the neutralization titration are caustic soda (a mol), sodium sulfide (b mol), sodium hydrosulfide (c mol) and sodium carbonate (d mol) per 1 liter of the waste soda. When these components are neutralized with hydrochloric acid, the reactions are expressed by the following equations.

$$NaOH + HCl \rightarrow NaCl + H_2O \quad (1)$$

$$Na_2S + HCl \rightarrow NaCl + NaHS$$

$$Na_2CO_3 + HCl \rightarrow NaCl + NaHCO_3$$

$$NaHS + HCl \rightarrow NaCl + H_2S \quad (2)$$

$$NaHCO_3 + HCl \rightarrow NaCl + H_2O + CO_2$$

It must be noted that the equivalent weight number (A) of an acid determined by the neutralization titration up to the pH of about 9 is the total amount of the acid which is consumed by the above three neutralization reactions expressed by the group (1) in the above equations.

Furthermore, the equivalent weight number (B) of the acid determined by the neutralization titration up to the pH of about 4 is the total amount of the acid consumed by five types of neutralization reactions expressed by the groups (1) and (2) in the above equations.

That is, the equivalent weight numbers (A) and (B) determined by the neutralization titration of the present invention are represented by the contents a, b, c and d of the respective components as follows:

$$A = a + b + d$$

$$B = a + 2b + c + 2d$$

From the above two equations, the following equation [II] is obtained:

$$2A - B = a - c \quad [II]$$

From this result, it is understood that the value of (2A−B) means the difference between the amount caustic soda (a) and the amount of sodium hydrosulfide (c) in the waste soda.

The value of (2A−B) obtained as a result of neutralization titration of an aqueous alkali waste is described herein.
(i) A case of: 2A−B=0 (a=c)

In this case, caustic soda and sodium hydrosulfide exist in the aqueous alkali waste in an equimolar amount. Accordingly, as is understood from the above described equation of the oxidation reaction of sodium hydrosulfide, OH⁻ ions required for leading the oxidation of sodium hydrosulfide to the final stage thereof exist in proper quantities, so that the oxidation proceeds up to the stage of sodium sulfate. However, it is preferred that a more excessive amount of OH⁻ ions exists for proceeding rapidly the oxidation of sodium thiosulfate which is the intermediate stage of the oxidation reaction.
(ii) A case of: 2A−B<0 (a<c)

In this case, the number of moles of caustic soda is less than that of sodium hydrosulfide in the aqueous alkali waste. For this reason, the oxidation of sodium hydrosulfide either terminates at the stage of sodium thiosulfate or proceeds further to the stage of sodium sulfate depending upon the conditions of the oxidation reaction. As a result, the liquid to be treated with the oxidation becomes acidic, and the problem of corrosion of equipment is caused to occur.

In accordance with the process of the present invention, if the oxidation is carried out by employing an aqueous alkali waste which satisfies a relationship of the equation [I] of: 2A−B>0, wherein A is an equivalent weight number of a strong acid consumed until the pH reaches about 9 as a result of neutralization titration, and B is another equivalent weight number of the strong acid consumed until the pH reaches about 4, the alkalinity required for the reaction can positively be maintained. In addition, it is also advantageous in view of the reaction efficiency.

The neutralization titration determining the equivalent weight number (A) can be carried out by using an ordinary indicator which changes the color at the pH of about 9. Definite examples of these indicators include phenolphthalein, thymolphthalein and the like which change the color within a pH range of from 8.3 to 10.0.

Meanwhile, the neutralization titration for determining the equivalent weight number (B) can be carried out by employing an ordinary indicator which changes the color at the pH of about 4. An example of such indicator is methyl orange which changes the color within a pH range of from 3.1 to 4.4.

The neutralization titration is conducted by a method utilizing electrical conductance which determines the changes in pH value to obtain the equivalent weight number, in addition to the above method employing the indicators.

Examples of the strong acids used for the titration includes sulfuric acid, nitric acid and hydrochloric acid, and a preferable one is hydrochloric acid which is used in the form of aqueous solution.

Furthermore, it is necessary that a neutralized solution is heated and boiled to liberate carbon dioxide and hydrogen sulfide which are produced by the neutralization in the vicinity of the end point to determine the equivalent weight number (B).

The neutralization titration may be carried out in accordance with an ordinary method. For instance, the procedure therefor is as follows. In this case, it must be noted that any water used other than the raw material waste liquid is deionized water and all the reagents to be used are guaranty reagents.
(Procedure for Neutralization Titration)
(1) Neutralization Titration Equipment
  300 ml flask and burette
(2) Neutralization Titration Reagent
  (a) 0.5 N aqueous hydrochloric acid: Prepared by diluting 50 ml of concentrated hydrochloric acid into 1 liter of water and standardizing the same with sodium carbonate.
  (b) Indicators
  Phenolphthalein: 0.1% solution
  Methyl orange: 0.1% solution
(3) Titrating Method
  Into a 300 ml flask is placed an appropriate amount of test sample (e.g. 10 ml), about 50 cc of water is further added, three drops of phenolphthalein are added thereto, and then titration is started using 0.5 N aqueous hydrochloric acid. The point at which the pink color of phenolphthalein disappears is the end point. The equivalent weight number of hydrochloric acid in the 0.5 N aqueous hydrochloric acid consumed for the titration is represent by (A). Thereafter, the titration is further continued by adding three drops of methyl orange. The point at which the color of the solution changes from red to orange is the end point. The equivalent weight number of hydrochloric acid in the 0.5 N aqueous hydrochloric acid consumed during the period from the start of titration to the termination of titration with the methyl orange is represented by (B). In the vicinity of the end point of titration operations in the latter stage, the neutralized solution is suitably heated and boiled to liberate carbon dioxide and hydrogen sulfide which are produced by the neutralization, and if necessary, the titration is further continued to lead the same to the end point.

The neutralization titration is applied to the raw material waste liquid before the oxidation reaction as described above. When the value calculated with the equation [II]: 2A–B is zero or negative value, an alkali is suitably added to the raw material waste liquid so that the value of the above equation becomes positive. On the other hand, when the values (A) and (B) satisfy the relationship of the equation [I]: 2A–B>0, the raw material waste liquid is served for the oxidation reaction as it stands.

The alkali to be added is not especially limited but it is exemplified by caustic soda, caustic potash, ammonia and the like. Preferable one is caustic soda, and it is added in the form of an aqueous solution. The point at which the alkali is added can be any point before the raw material waste liquid is introduced into a wet oxidation reactor.

In the present invention, if the values (A) and (B) satisfy the relationship of equation [I]: 2A–B>0, any further addition of an alkali is not required. However, if the value of 2A–B is an excessively large positive number, the use quantity of the neutralizing agent becomes excessively large in the process in which the waste liquid after the oxidation is neutralized and discharged. Thus, it is preferred to arrange such that the value of 2A–B per 1 liter of waste liquid does not exceed usually 1.5. In this case, it is also possible that the value of 2A–B does not exceed 1.5 by adding an acid such as dilute sulfuric acid.

In the above described scrubber, it is usually adjusted such that the quantity of alkali is more excessive than the quantity of acidic substance contained in the hydrocarbon fluid as described above. A device for adjusting the addition quantity of alkali is provided for a case in which the contents of acidic substance vary due to the above adjustment. Accordingly, it is preferred to add also an additional amount of alkali by utilizing this device when the alkalinity of the wash liquid in the scrubber is adjusted. As a matter of course, it is also possible to add the alkali by disposing a separate apparatus at a point before the oxidation reactor as described in the foregoing Japanese Patent Laid-Open Publication No. 4-338285.

In the wet oxidizing process according to the present invention, a gas containing molecular oxygen such as oxygen and air is brought into contact with an aqueous solution of sulfide under a high temperature and a high pressure conditions, in which the sulfide is oxidized into sodium sulfate.

The reaction temperature is within a range of from 150 to 350° C., and preferably from 150 to 230° C. The contents of hydrocarbons in the gas obtained from a naphtha cracker are naturally small. However, a problem that the oxidation reaction becomes unstable is caused to occur even when a small quantity of hydrocarbons are contained in the washing waste liquid. Accordingly, it is preferable that the oxidizable organic substances such as hydrocarbons or else are previously removed by a suitable removing means such as extracting operation.

In this case, however, it is preferable that the reaction is carried out at a low temperature in order to avoid substantially the oxidation even when organic substances are contained. For instance, it is suitable to carry out the reaction at a temperature of 150 to 230° C., and preferably from 150 to 210° C. If the temperature is within this range, sodium sulfide is oxidized sufficiently to produce sodium sulfate.

The pressure for the oxidation may be a value at which the reaction is maintained in liquid phase. For example, the value may be arbitrarily selected from the range of 1 to 1,000 kg/cm$^2$.

As the molecular oxygen which is brought into contact with the raw material alkali waste liquid, oxygen gas, air, or the mixture of them is employed.

The type of reaction is not especially limited and a batchwise reactor can be used. However, a continuous flow-type reactor is preferable. In this type, the raw material waste liquid is introduced continuously into an oxidation reactor, and a molecular oxygen is also continuously introduced into the reactor. The mode of reaction of continuous flow-type like this is apparently advantageous as compared with the batchwise reaction in view of the modes of industrial working. In the continuous flow-type, the flow rate of waste soda liquid is selected from a range of, for example, from 0.1 to 1,000 liter/hr and the flow rate of the gas containing molecular oxygen is selected from a range of 0.001 to 1,000 Nm$^3$/hr.

When a heat exchanger for exchanging the heat between a raw material waste liquid and a treated liquid is disposed before or after the oxidation reactor, the heat generated from the oxidation reaction can be recovered. A structure of the oxidation reactor itself is not especially limited, but any well-known means may be employed. For instance, a double cylindrical type reactor in which an oxygen-containing gas is introduced from the lower part of the reactor into the inside of an inner cylinder, and liquid circulation from the inside to the outside of the inner cylinder (into the space between an outer cylinder and the inner cylinder) is conducted by utilizing the flowing of a gas stream which goes up inside the inner cylinder as described in Japanese Patent Publication No. 55-41158, is particularly suitable for the process of the present invention. In this case, it is advantageous in that the heat exchanger is not necessary. However, also in the case of the use of the double cylindrical type reactor, a heat exchanger can be optionally employed.

In the wet oxidation of the present invention, any catalyst is not necessary, and it is preferable to carry out the reaction without any catalyst. However, any catalyst can also be employed so far as the advantageous effects of the present invention are expected.

After the wet oxidation is finished, the treated liquid is discharged to the outside of the system as it stands or with dilution by suitable water or with neutralization by an appropriate acid.

DETAILED DESCRIPTION OF THE PREFERRED EMBODIMENTS

The present invention will be described in more detail hereinafter in relation to embodiments, in which any of the neutralization titrating operations in the following examples and comparative examples was carried out in accordance with the procedure for the above described neutralization titration.

COMPARATIVE EXAMPLE 1

One liter of a model of waste aqueous soda was prepared by dissolving 2.30 g of sodium carbonate, 8.16 g of caustic soda and 11.9 g of sodium hydrosulfide into pure water. Neutralization titration was carried out in connection with the resulting aqueous solution. As a result, values of A=0.226 equivalent/liter and B=0.460 equivalent/liter were obtained by the use of a phenolphthalein indicator and a methyl orange indicator, respectively. That is, the value of the above described equation [II]: 2A–B was negative in this case.

The above described model waste aqueous soda was then subjected to wet oxidation with the use of air of 180° C. and 35 atm for 1 hour. As a result, the remaining S$^{--}$ ion was decreased to a level of 7 ppm, but 0.7% of sodium thiosulfate in the intermediate stage of the oxidation reaction was detected. So that the wet oxidation was regarded as insufficient.

EXAMPLE 1

One liter of a model waste aqueous soda was prepared by dissolving 2.30 g of sodium carbonate, 8.89 g of caustic soda and 11.9 g of sodium hydrosulfide into pure water. Neutralization titration was carried out in connection with this aqueous solution. As a result, values of A=0.244 equivalent/liter and B=0.478 equivalent/liter were obtained by the use of a phenolphthalein indicator and a methyl orange indicator, respectively. That is, the value of the above described equation [II]: 2A−B was positive in this case.

Then, the above described model waste aqueous soda was subjected to wet oxidation with the use of air of 180° C. and 35 atm for 1 hour. As a result, neither the remaining S$^{--}$ ion nor the sodium thiosulfate was detected. So that, it was understood that the wet oxidation was perfectly completed. Furthermore, the pH of the treated reaction liquid after the wet oxidation was 11.9. This value was on such a level that no problem of corrosion of equipment due to the acid is caused to occur.

COMPARATIVE EXAMPLE 2

One liter of a model waste aqueous soda was prepared by dissolving 6.6 g of sodium carbonate, 22.4 g of caustic soda, 77.6 g of sodium hydrosulfide and 9.1 g of sodium sulfate into pure water. Neutralization titration was done in connection with the resulting aqueous solution. As a result, values of A=0.727 equivalent/liter and B=2.279 equivalent/liter were obtained by the use of a phenolphthalein indicator and a methyl orange indicator, respectively. That is, the value of the above described equation [II]: 2A−B was negative in this case.

Then, the above described model waste aqueous soda was subjected to wet oxidation with the use of air of 180° C. and 35 atm for 1 hour. As a result, the remaining S$^{--}$ ion was decreased to a level of 7 ppm, but 6.4% of sodium thiosulfate in the intermediate stage of the oxidation reaction was detected, so that it was understood that the wet oxidation was insufficiently attained.

EXAMPLE 2

(Washing with a scrubber)

A gas which mainly contained ethylene, hydrogen, hydrogen sulfide and carbon dioxide was obtained from a naphtha cracker for producing ethylene. It was washed with an aqueous alkali in a scrubber.

The wash liquid which was used in the scrubber was an aqueous caustic soda. The aqueous alkali waste after the absorption of hydrogen sulfide and carbon dioxide exhibited alkalinity. Neither mercaptans nor thiosulfuric acids were substantially contained therein. Oily hydrocarbons which were entrained therein because of insufficient separation were removed separately by means of extracting operation.

(Wet Oxidation)

Neutralization titration was carried out in connection with the washing waste liquid obtained from a soda washing tower in the above-mentioned scrubber. As a result, values of A=0.926 equivalent/liter and B=1.840 equivalent/liter were obtained by the use of a phenolphthalein indicator and a methyl orange indicator, respectively. That is, the value of the above described equation [II]: 2A−B was positive in this case.

This washing waste liquid was subjected to wet oxidation in the like manner as that of Example 1. As a result, the remaining S$^{--}$ ion in the treated liquid was decreased to 6 ppm and the pH value thereof was 11.9. It was, thus, confirmed that there was no apprehension of corrosion of the equipment due to the acid.

COMPARATIVE EXAMPLE 3

In order to remove the sulfur content in an aromatic hydrocarbon fraction mainly containing $C_8$ hydrocarbons obtained from a device for isomerizing aromatic hydrocarbons, the aromatic hydrocarbon fraction was washed with an aqueous caustic soda. Neutralization titration was conducted in connection with the washing waste liquid obtained from a soda washing tower. As a result, values of A=0.418 equivalent/liter and B=0.848 equivalent/liter were obtained by the use of a phenolphthalein indicator and a methyl orange indicator, respectively. That is, the value of the above described equation [II]: 2A−B was negative in this case.

This washing waste liquid was subjected to wet oxidation in the like manner as that of Example 1. As a result, the remaining S$^{--}$ ion in the treated liquid was decreased to a level of 8 ppm, but sodium thiosulfate in the intermediate stage of the oxidation reaction was detected and the pH value thereof was lowered to 7.9.

The oily hydrocarbons contained scarcely in the washing waste liquid were removed by separation of extraction with a heavy isomerized fraction prior to the wet oxidation. Furthermore, as a result of a separate chemical analysis, it was confirmed that acidic materials contained in the $C_8$ aromatic hydrocarbon fraction were mainly hydrogen sulfide and carbon dioxide.

When the waste soda having a specified composition in the present invention is employed, the wet oxidizing process for the waste soda can be operated safely, simply, and efficiently.

The method in which calculation is done on the basis of dissociation constants which is proposed in the above described Japanese Patent Laid-open Publication No. 4-338285 involves a problem of uncertain dissociation constants, although the method is considered to be logical seemingly, but it cannot be regarded as reliable, because the investigation of reaction and the analyzing methods in a high alkaline region are insufficient at the present time. On the contrary, the present invention has been established with respect to a specific waste liquid based on the practical experience of the present inventors for a long period of time. Therefore, the present process is a very convenient and extremely reliable method.

It will be appreciated by those skill in the art that the present invention can be embodied in other specific forms without departing from the essential features thereof.

The embodiments are considered in all respects to be illustrative and not restrictive. The scope of the invention is indicated by the appended claims rather than the foregoing description, and all changes that come within the meaning and range of equivalents are intended to be embraced therein.

What is claimed is:

1. In a wet oxidizing process for oxidizing an aqueous alkali waste by using molecular oxygen, said aqueous alkali waste being obtained by bringing an aqueous alkali into contact with a hydrocarbon fluid containing hydrogen sulfide and carbon dioxide as the main acidic substances and absorbing said acidic substances, the improvement comprising determining an equivalent weight number A of a strong acid which is consumed until the pH of said aqueous alkali waste reaches about 9 and an equivalent weight number B of the strong acid which is consumed until the pH reaches about 4 in neutralization titration of said aqueous alkali waste prior to said oxidizing;

calculating the value 2A−B;

adding an alkali substance to the aqueous alkali waste prior to said oxidizing if the relationship in the following equation is not satisfied:

$$2A-B>0,$$

in an amount so that the value of 2A−B prior to said oxidizing is greater than 0 but does not exceed 1.5, or adding an acid to the aqueous alkali waste prior to said oxidizing if the relationship in the following equation is not satisfied:

$$2A-B \leq 1.5,$$

in an amount so that the value of 2A−B prior to said oxidizing is greater than 0 but does not exceed 1.5, said equivalent weight numbers A and B being based upon 1 liter of aqueous alkali waste, wherein said wet oxidation is performed by using continuous flow equipment.

2. The wet oxidizing process as claimed in claim 1, wherein said aqueous alkali is an aqueous caustic soda.

3. The wet oxidizing process as claimed in claim 1 wherein said alkali substance which is added to the aqueous alkali waste is caustic soda, caustic potash, or ammonia.

4. The wet oxidizing process as claimed in claim 1 wherein sulfate ions and hydrosulfide ions are subject to said wet oxidization in the absence of a catalyst.

5. The wet oxidizing process as claimed in claim 1 wherein the equivalent weight numbers A and B are determined from the same waste liquid sample by means of successive titration operations.

6. The wet oxidizing process as claimed in claim 1 wherein the equivalent weight numbers A and B are determined from different samples of the waste liquid which are titrated separately.

7. The wet oxidizing process as claimed in claim 1 wherein the neutralization titration to determine the equivalent weight number is carried out with an indicator which changes color within a pH range of from 8.3 to 10.0.

8. The wet oxidizing process as claimed in claim 7 wherein said indicator is phenolphthalein.

9. The wet oxidizing process as claimed in claim 1 wherein the neutralization titration to determine the equivalent weight number B is carried out with an indicator which changes color within a pH range of from 3.1 to 4.4.

10. The wet oxidizing process as claimed in claim 9 wherein said indicator is methyl orange.

11. The wet oxidizing process as claimed in claim 1 wherein the neutralization titrations are conducted using electrical conductance to determine changes in pH value to obtain the equivalent weight numbers.

12. The wet oxidizing process as claimed in claim 1 wherein after neutralization titration, the resulting neutralized solution is heated to liberate carbon dioxide and hydrogen sulfide which are produced by the neutralization.

13. The wet oxidizing process as claimed in claim 1 wherein said oxidizing is conducted at a reaction temperature within a range of from 150° C. to 350° C. and a pressure of from 1 kg/cm$^2$ to 1000 kg/cm$^2$.

14. A wet oxidation process for oxidizing an aqueous alkali waste by using molecular oxygen, said aqueous alkali waste being obtained by bringing an aqueous alkali into contact with a hydrocarbon fluid containing hydrogen sulfide and carbon dioxide as the main acidic substances and absorbing said acidic substances, consisting essentially of:

a) determining an equivalent weight number A of a strong acid which is consumed until the pH of said aqueous alkali waste reaches about 9 and an equivalent weight number B of the strong acid which is consumed until the pH reaches about 4 in neutralization titration of said aqueous alkali waste prior to said oxidizing;

b) calculating the value 2A−B;

said equivalent weight numbers A and B being based upon 1 liter of aqueous alkali waste;

c) adding an alkali substance to the aqueous alkali waste prior to said oxidizing if the relationship in the following equation is not satisfied:

$$2A-B>0,$$

in an amount so that the value of 2A−B prior to said oxidizing is greater than 0 but does not exceed 1.5, or adding an acid to the aqueous alkali waste prior to said oxidizing if the relationship in the following equation is not satisfied:

$$2A-B \leq 1.5,$$

in an amount so that the value of 2A−B prior to said oxidizing is greater than 0 but does not exceed 1.5; and d) carrying out the wet oxidation by oxidizing an aqueous alkali waste by using molecular oxygen.

15. The wet oxidation process as claimed in claim 14, wherein said wet oxidation is performed by using continuous flow equipment.

* * * * *